J. D. COOK.
ARTIFICIAL FILTRATION.
No. 187,966. Patented March 6, 1877.
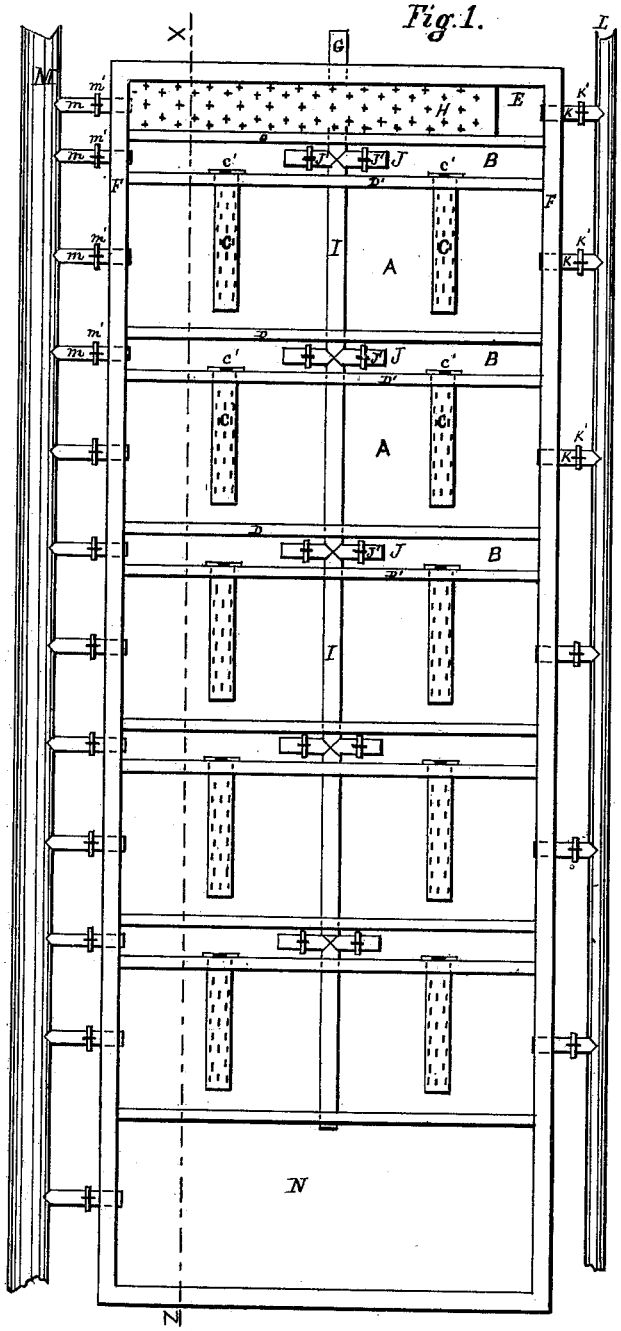
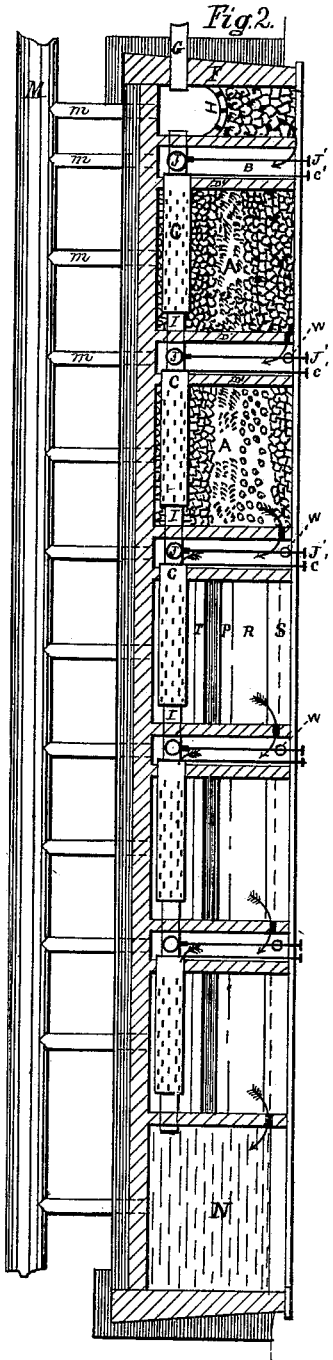
WITNESSES
E. W. Perrin
C. J. Shipley
INVENTORS
J. D. Cook

UNITED STATES PATENT OFFICE.

JOSIAH D. COOK, OF TOLEDO, OHIO.

IMPROVEMENT IN ARTIFICIAL FILTRATION.

Specification forming part of Letters Patent No. 187,966, dated March 6, 1877; application filed November 10, 1876.

*To all whom it may concern:*

Be it known that I, JOSIAH D. COOK, of Toledo, Lucas county, Ohio, have invented a new and useful Improvement in Artificial Filtration, which improvement is fully set forth in the following specification, reference being had to the accompanying drawing, of which—

Figure 1 is plan, and Fig. 2 is section through X Z.

The object of the invention is to secure rapid and thorough filtration and purification of water for public and private uses, by upward percolation of water through suitable filtering materials contained in filtering-chambers A, as shown in the accompanying drawing.

The filtering-chambers A are to be increased or diminished in number and size, in accordance with the texture of the filtering material, the normal purity or impurity of the water to be filtered, and the rate of filtration required.

The receiving-chambers B are to be provided with coarse filtering materials or left open, and to be of such a size as to facilitate the downward passage of water equal to the upward filtering capacity of the filtering-chambers A, which they are designed to supply, chambers A to be supplied with broken stone, gravel, sand, charcoal, sponge, felt, or other filtering materials.

An unobstructed water-way is to be maintained along the delivery-chamber E by means of arched masonry H, or other device, to support the coarse filtering material, and to be supplied with pipes or other openings, to admit of the upward passage of water.

The walls D D' between the several chambers and the surrounding walls F are to be of brick or stone masonry, or other building material.

The walls D will be provided with pipes or openings at the top, for the passage of water from the delivery-chamber E into the receiving-chamber B; and a further series of pipes or other openings will be provided for discharging water at the bottom of walls D' into filtering-chambers A. These pipes or openings will connect with perforated pipes O or other device, designed to uniformly distribute the water under the entire bottom or lower area of the filtering materials, the water thence passing upward through filtering materials T P R S, and through upper openings in walls D, repeating the same until discharged into reservoir N.

All influent openings at bottom of filtering-chambers to be provided with gates C', to be closed during the process of cleansing the chambers with which they respectively connect. Sediment and other impurities removed from the water, and deposited on the the under side of filtering materials T P R S, or precipitated to the bottom of chambers to be removed by drain-pipes *m* into sewer M, these drain-pipes to be provided with valves *m'*.

As an auxiliary to thorough cleansing, an independent pipe, L, will be placed longitudinally along the outside of the walls inclosing the series of chambers, and on the side opposite the sewer, this pipe to be supplied with proper valves K' and branch pipes K extending into chambers A, for the purpose of forcing water rapidly through the coarse filtering material on and contiguous to the bottom, or otherwise arranged to facilitate the cleansing process by passing water from top to bottom of said chambers.

To obviate the necessity of throwing all the filtering-chambers out of service whenever it shall be necessary to cleanse the material or remove sedimentary deposits, an independent supply pipe or pipes, I, will be placed near the bottom and extending from delivery-chamber E to and into the reservoir N, and are so arranged that, by opening valves J' and closing gates C', chambers A can be shut off, the water passing in pipe I through the chamber to be cleansed, and into the next chamber B, and by opening-valves K' and *m'* forcing water from pressure-pipe L through chamber A into sewer M.

Overflow or waste pipes W will be placed in delivery-chamber E, and in receiving-chambers B to facilitate the overflow of surplus water into sewer M, delivery-chamber E to be supplied through influent-pipes G J and K.

I claim—

1. Pipes I and J, valves J', and gates C' for conveying water from B to B without entering chamber A.

2. In combination with the filtering-compartments, the pipes L and K, and valves K' for the admission of cleansing-water.

3. Chambers E, B, and A, in combination with the walls D and D', having openings, and the perforated pipe C and overflow-pipe W, for the purposes as herein set forth.

JOSIAH D. COOK.

Witnesses:
  E. W. PERRIN,
  C. J. SHIPLEY.